US008160763B2

(12) United States Patent
Tamai et al.

(10) Patent No.: US 8,160,763 B2
(45) Date of Patent: Apr. 17, 2012

(54) METHOD AND APPARATUS FOR CONTROLLING CREEP TORQUE IN A VEHICLE EQUIPPED WITH A HYBRID POWERTRAIN SYSTEM

(75) Inventors: Goro Tamai, West Bloomfield, MI (US); Lan Wang, Troy, MI (US); Jinchun Peng, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 433 days.

(21) Appl. No.: 12/544,418

(22) Filed: Aug. 20, 2009

(65) Prior Publication Data
US 2011/0046829 A1 Feb. 24, 2011

(51) Int. Cl.
*G06F 19/00* (2006.01)
(52) U.S. Cl. ............... 701/22; 701/51; 180/65.265
(58) Field of Classification Search .............. 701/22, 701/36, 51, 53, 54, 67, 68, 87; 180/65.265–65.285, 180/65.31, 65.8; 477/2–7
See application file for complete search history.

(56) References Cited

U.S. PATENT DOCUMENTS

| | | | |
|---|---|---|---|
| 8,042,632 B2 * | 10/2011 | Wisniewski | 180/65.265 |
| 2002/0065166 A1 | 5/2002 | Jeon | |
| 2003/0085576 A1 | 5/2003 | Kuang et al. | |
| 2003/0225501 A1 | 12/2003 | De La Salle et al. | |
| 2004/0215385 A1 | 10/2004 | Aizawa et al. | |
| 2005/0272558 A1 * | 12/2005 | Yoshida et al. | 477/180 |
| 2008/0125287 A1 | 5/2008 | Kakiuchi et al. | |
| 2008/0228369 A1 * | 9/2008 | Stroh et al. | 701/84 |

* cited by examiner

*Primary Examiner* — Richard M. Camby

(57) ABSTRACT

Vehicle creep control includes executing a first control scheme to determine a preferred output torque as a first function of the operator input to the brake pedal when the actual direction of vehicle travel is a first direction and the operator-selected direction of vehicle travel is also the first direction, and executing a second control scheme to determine the preferred output torque as a second function of the operator input to the brake pedal when the actual direction of vehicle travel is a second direction and the operator-selected direction of vehicle travel is the first direction.

15 Claims, 3 Drawing Sheets

METHOD AND APPARATUS FOR CONTROLLING CREEP TORQUE IN A VEHICLE EQUIPPED WITH A HYBRID POWERTRAIN SYSTEM

TECHNICAL FIELD

This disclosure pertains to control systems for powertrain systems, including hybrid powertrain systems.

BACKGROUND

The statements in this section merely provide background information related to the present disclosure and may not constitute prior art.

Vehicles use powertrain systems to generate tractive torque, including hybrid powertrain systems that transfer torque through a transmission to an output member. Known hybrid powertrain systems for motor vehicles include internal combustion engines and torque machines that transfer tractive torque to one or more drive wheel(s), including transferring torque through a transmission device to an output member. The output member can be coupled to a driveline for transferring tractive torque thereto. One known hybrid powertrain system includes electric machines that are configured to operate as torque motors and electric power generators that exchange electric power with an electric energy storage device. Another known hybrid powertrain system includes hydraulic machines that are configured to operate as torque motors and hydraulic power generators that exchange hydraulic power with a hydraulic power accumulator.

Known powertrain control schemes include generating a low level of tractive torque subsequent to an operator command for vehicle braking. A low level of tractive torque causes the vehicle to maintain a slow, preferably constant vehicle speed, referred to as creep, when the vehicle is on a level surface with operator-applied braking and with no operator-applied braking and no operator input to an accelerator pedal. A low level of tractive torque, i.e., a creep torque can cause a vehicle to begin a low speed forward motion when a vehicle operator releases a brake pedal without applying the accelerator pedal when the vehicle is on a flat surface. Furthermore, a low level of tractive torque holds the vehicle and prevents rollback when a vehicle operator releases a brake pedal while the vehicle is on an inclined surface. This is intended to be responsive to an operator expectation that the vehicle remain stationary and not roll backwards. The low level of tractive torque is preferably generated by the torque machine(s) of the hybrid powertrain, consuming some level of stored power and generating heat in the torque machine(s). Known hybrid powertrain systems include generating a creep torque that decreases at a fixed rate relative to operator brake pedal input.

SUMMARY

A method for controlling a powertrain system including an engine and a hybrid transmission configured to propel a land vehicle includes monitoring a speed of the vehicle, determining an actual direction of vehicle travel as one of a first direction and a second direction, monitoring operator inputs to a brake pedal and an accelerator pedal, monitoring a position of a transmission range selector to determine an operator-selected direction of vehicle travel as one of the first direction and the second direction, and operating the hybrid powertrain in a creep torque mode at a preferred output torque when the operator input to the accelerator pedal is zero and the magnitude of speed of the vehicle is less than a predetermined threshold. The creep torque mode includes executing a first control scheme to determine the preferred output torque as a first function of the operator input to the brake pedal when the actual direction of vehicle travel is the first direction and the operator-selected direction of vehicle travel is also the first direction, and executing a second control scheme to determine the preferred output torque as a second function of the operator input to the brake pedal when the actual direction of vehicle travel is the second direction and the operator-selected direction of vehicle travel is the first direction. A torque machine of the hybrid powertrain is controlled to generate tractive torque responsive to the preferred output torque.

BRIEF DESCRIPTION OF THE DRAWINGS

One or more embodiments will now be described, by way of example, with reference to the accompanying drawings, in which.

DETAILED DESCRIPTION

Figure 1:
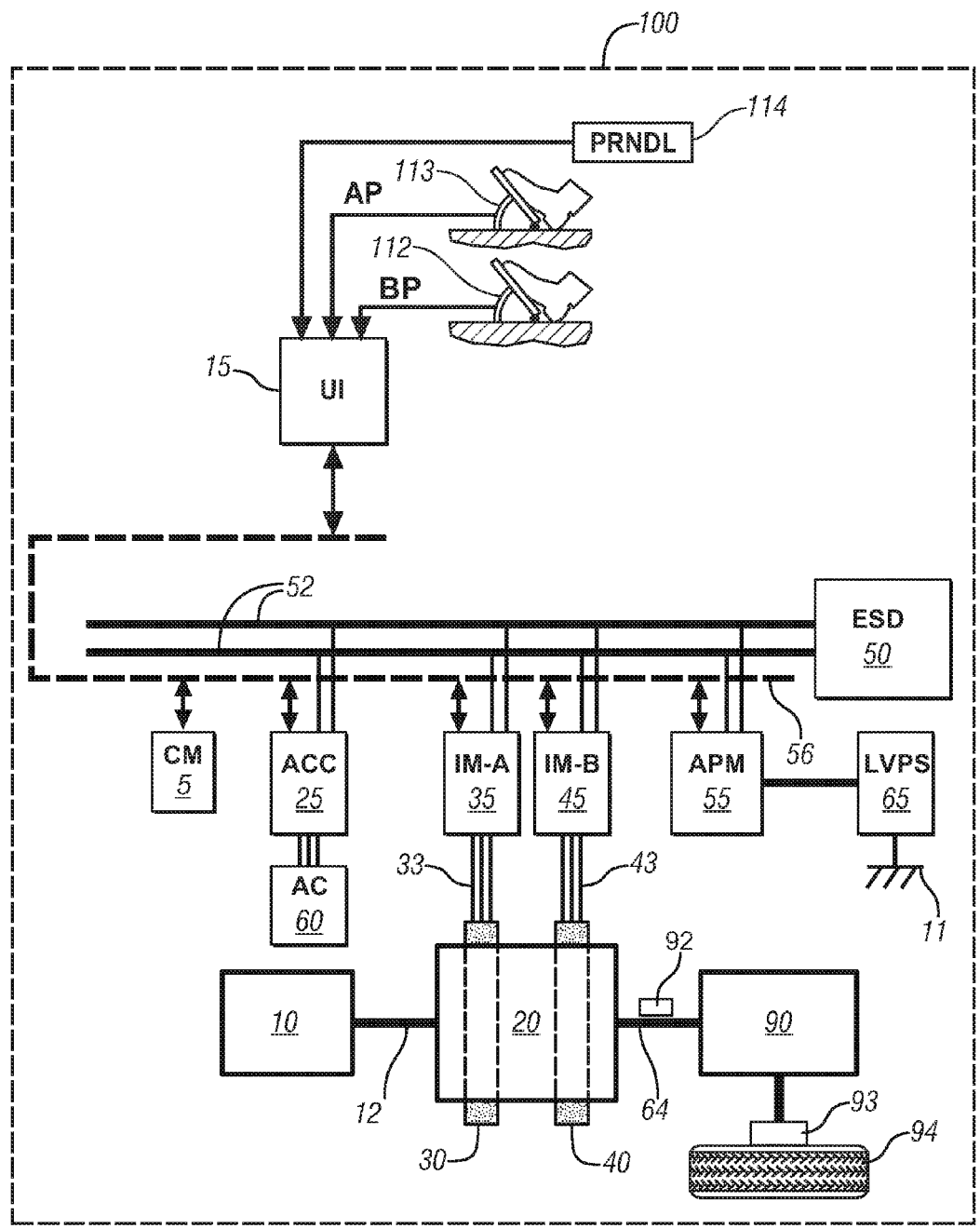
FIG. 1 is a schematic diagram of a vehicle including a hybrid powertrain, in accordance with the present disclosure.

Referring now to the drawings, wherein the showings are for the purpose of illustrating certain exemplary embodiments only and not for the purpose of limiting the same, FIG. 1 shows a vehicle 100 including a hybrid powertrain system. The exemplary hybrid powertrain system includes an internal combustion engine 10 mechanically coupled via an input member 12 to a hybrid transmission 20. The hybrid transmission 20 is configured to transfer torque among the input member 12, first and second torque machines 30 and 40, and an output member 64 coupled to a driveline 90 including one or more drive wheels 94 in response to an operator torque request and other power demands of the hybrid powertrain system. A rotational position sensor 92 is adapted to monitor rotational speed of an element of the driveline 90, from which vehicle speed (Vss) can be determined. The vehicle wheels including the drive wheels 94 are fitted with braking devices 93 to decelerate and stop movement of the vehicle 100 in response to an operator brake request input to a brake pedal (BP) 112.

Operation of the internal combustion engine 10, the hybrid transmission 20 and the first and second torque machines 30 and 40 is controlled by executing a plurality of control schemes that are elements of a control module (CM) 5. The internal combustion engine 10 combusts fuel to generate torque that is transferred to the input member 12. During ongoing vehicle and powertrain operation, the internal combustion engine 10 can operate in a torque-generating mode, a fuel cutoff mode, and an engine-off mode.

The hybrid transmission 20 preferably includes differential gears and clutches and selectively operates in one of a plurality of fixed gear, neutral, and continuously variable range states to transfer torque among the input member 12, the first and second torque machines 30 and 40, and the output member 64. The first and second torque machines 30 and 40 include electric motor/generator devices in one embodiment. First and second inverter modules (IM-A, IM-B) 35 and 45 transform potential electrical energy stored in an electrical energy storage device (ESD) 50 to electrical power that can be used by the first and second torque machines 30 and 40 to generate mechanical torque that is transferred to the hybrid transmission 20, and transforms mechanical torque transferred from the hybrid transmission 20 through one or both the first and second torque machines 30 and 40 to storable potential energy for storage in the ESD 50. Alternatively, or in addition, one or more of the vehicle wheels can be equipped with a wheel motor (not shown) to generate and transfer tractive torque to the drive wheel(s) 94.

The hybrid powertrain includes the on-board ESD 50 electrically connected to a high-voltage DC bus 52. The high-voltage DC bus 52 transfers electrical power between the ESD 50 and a plurality of power modules including power inverter modules for powering electric machines, auxiliary power modules for power exchange with low-voltage operating devices and systems, and accessory modules for powering on-vehicle accessory devices (not shown). In the embodiment shown, the high-voltage DC bus 52 transfers electrical power among the ESD 50 and the first and second inverter modules (IM-A, IM-B) 35 and 45, an auxiliary power module (APM) 55 and an auxiliary device shown as a power module (ACC) 25 operative to power a multiphase electric machine mechanically coupled to an air conditioning compressor (AC) 60 via the high-voltage DC bus 52.

The auxiliary power module (APM) 55 electrically connects to a low-voltage power supply (LVPS) 65 to transfer low-voltage electrical power therebetween. The low-voltage power supply (LVPS) 65 includes a 12 Vdc battery in one embodiment. The auxiliary power module (APM) 55 includes electric power and control circuitry to convert between high-voltage and low-voltage electric power.

A local area network (LAN) bus 56 signally connects to the control module (CM) 5, a user interface (UI) 15, the first and second inverter modules (IM-A, IM-B) 35 and 45, the auxiliary power module (APM) 55, and the power module (ACC) 25 in one embodiment. The local area network (LAN) bus 56 facilitates structured communication of states of operating parameters and actuator command signals between the connected control modules, including the aforementioned control modules. The specific communication protocol utilized is application-specific. The LAN bus 56 and appropriate protocols provide for robust messaging and multi-control module interfacing. Multiple communications buses may be used to improve communications speed and provide some level of signal redundancy and integrity.

A vehicle operator commands operation of the vehicle and the powertrain system using a plurality of user interface devices that are signally connected to the user interface (UI) 15. Preferred interface devices include the brake pedal (BP) 112, an accelerator pedal (AP) 113, a transmission range selector (PRNDL) 114, an operator key (not shown) and a steering wheel (not shown). The operator commands a key-on event and a key-off event using the operator key. The operator commands magnitude and longitudinal direction (i.e. forward and backward/reverse) of vehicle travel via the transmission range selector (PRNDL) 114 and operator torque requests using the accelerator pedal (AP) 113 and the brake pedal (BP) 112. The operator torque request includes vehicle acceleration and braking. The operator also commands vehicle travel path using the steering wheel. The interface devices are illustrative and not restrictive. The user interface (UI) 15 is shown as a single discrete device for ease of description. It should be recognized that the functions performed thereby may be executed in one or more separate devices, including, e.g., the brake pedal (BP) 112 directly signally connected to a brake control module (not shown) to control the vehicle wheel brakes 93.

The control module 5 is preferably a general-purpose digital computer that executes a plurality of control schemes in the form of algorithmic code and calibrations to control operation of the vehicle 100. The control schemes include controlling operation of the power modules including power inverter modules for powering electric machines, auxiliary power modules for power exchange with low-voltage operating devices and systems, and accessory modules for powering on-vehicle accessory devices. In the illustrated embodiment, the power inverter modules include the first and second inverter modules (IM-A, IM-B) 35 and 45, the auxiliary power modules for power exchange with low-voltage operating devices and systems include an auxiliary power module (APM) 55, and the accessory modules for powering on-vehicle accessory devices include the power module (ACC) 25 in the depicted embodiment. The control module 5 provides respective functions, including monitoring inputs from sensing devices and executing control and diagnostic routines to control operation of actuators using preset calibrations. The control module 5 is shown as an individual discrete device for ease of description. It should be recognized that the functions performed thereby may be executed in a plurality of control module devices that individually control elements of the powertrain system including, e.g., a control module for the engine 10, a control module for the transmission 20, and control module(s) for the first and second inverter modules 35 and 45 of the torque machines 30 and 40. Furthermore, control elements described can be implemented in software, hardware, and/or application-specific integrated circuitry (ASIC).

The exemplary powertrain system as described is meant to be illustrative. The control schemes described herein are applicable to electric vehicles and hybrid powertrain systems wherein driveline torque can be generated by a torque machine, including, series and parallel hybrid powertrain systems, hybrid powertrain systems employing belt-alternator-starter systems in which an electric torque motor can transfer mechanical torque to an engine crankshaft, powertrain systems employing wheel motors, and range-extended electric vehicle systems.

Figure 2:
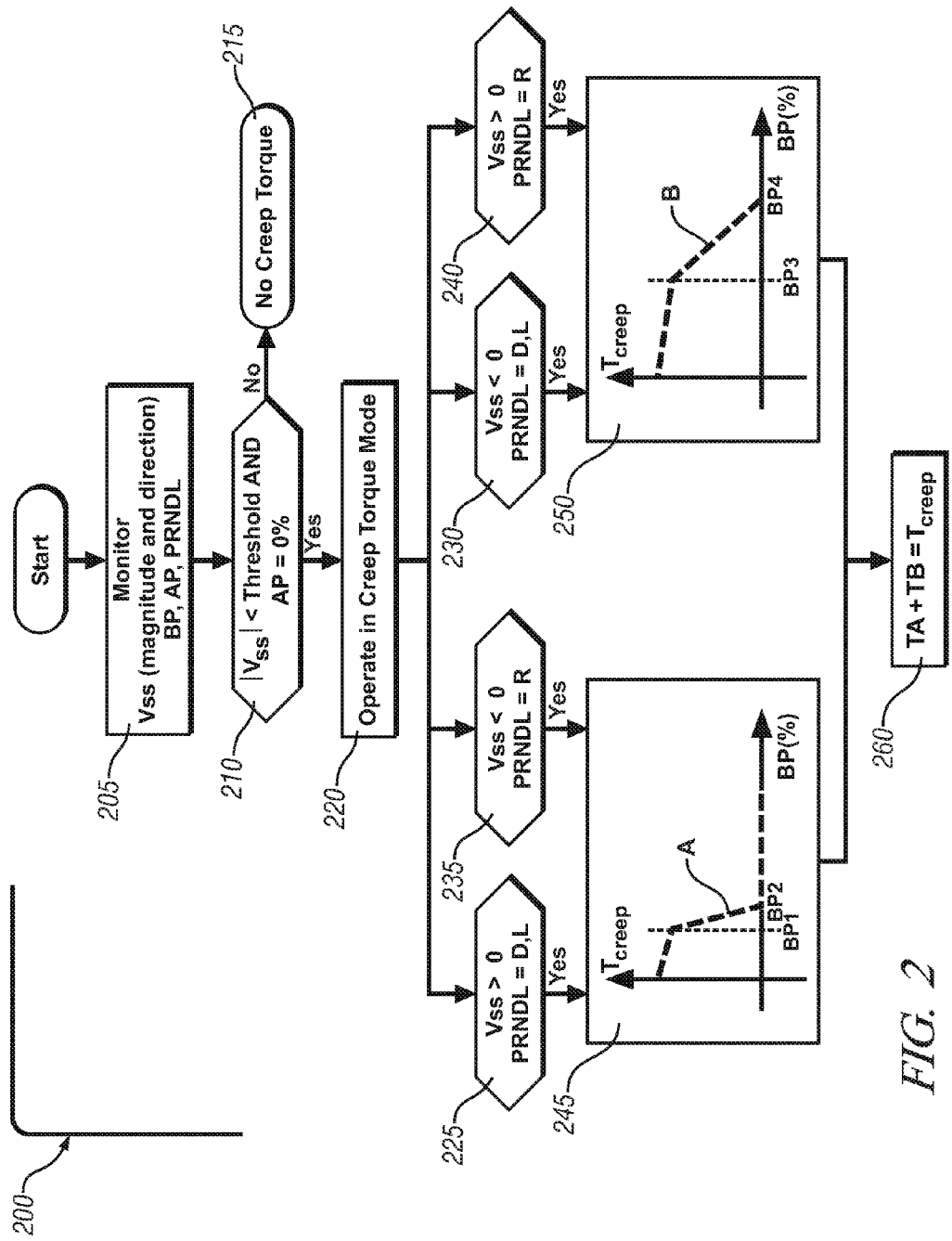
FIG. 2 is a flowchart, in accordance with the present disclosure.

FIG. 2 schematically shows a flowchart including a method 200 for controlling a hybrid powertrain system, e.g., the hybrid powertrain system described with reference to FIG. 1, to effect vehicle creep. Effecting vehicle creep includes vehicle hill-holding to prevent or mitigate vehicle rollback on an inclined surface. The method 200 includes monitoring vehicle speed (Vss) preferably using the rotational position sensor 92 to determine a magnitude (i.e. speed) (km/h) and a direction of vehicle travel (i.e., one of forward and backward/reverse). Signal outputs from the brake pedal (BP) 112 the accelerator pedal (AP) 113, and the position of the transmission range selector (PRNDL) 114 are ongoingly monitored (205).

When the operator has disengaged the accelerator pedal (AP) 113, e.g., as indicated by a signal output from the accelerator pedal (AP) 113 of 0% and when the absolute vehicle speed (|Vss|) is less than a predetermined threshold, operation in a creep torque mode is commanded (220). When either the operator has engaged the accelerator pedal (AP) 113, e.g., as indicated by a signal output from the accelerator pedal (AP) 113 of greater than 0%, or when the absolute vehicle speed is greater than a predetermined threshold, operation in the creep torque mode is disallowed (215).

Operating in the creep torque mode includes monitoring the direction of vehicle speed such as by rotational position sensor 92 wherein forward travel is indicated by positive speed measurements and backward/reverse travel is indicated by negative speed measurements. Operating in the creep torque mode also includes monitoring operator-selected direction of travel of the vehicle 100 indicated by the transmission range selector (PRNDL) 114, and selecting a magnitude of creep torque $T_{creep}$ based upon the operator input to the brake pedal (BP) 112 as indicated by a level of brake pedal depression, measured in percent (BP %) in one embodiment. One of a first and a second control scheme (245 and 250) can be executed depending upon the operator-selected direction of travel and the actual direction of travel of the vehicle 100. Preferably, the engine 10 is in an engine-off state or is otherwise decoupled from transferring torque to the vehicle driveline 90 when operating in the creep torque mode.

The first control scheme (245) is executed to determine the preferred output torque from the hybrid powertrain, i.e., the creep torque $T_{creep}$ associated with the operator input to the brake pedal (BP) 112 when the direction of vehicle travel is in a forward direction and the position of the transmission range selector (PRNDL) 114 indicates that the operator-selected direction of travel includes a forward gear, e.g., D (Drive) or L (Low) for the exemplary transmission range selector (PRNDL) 114 (225). The first control scheme (245) is also executed to determine the creep torque $T_{creep}$ associated with the operator input to the brake pedal (BP) 112 when the direction of vehicle travel is in a reverse direction and the position of the transmission range selector (PRNDL) 114 indicates that the operator-selected direction of travel includes the reverse gear (R) (235). The direction of vehicle travel is indicated by the rotational position sensor 92. The position of the transmission range selector (PRNDL) 114 indicates that the operator-selected direction of travel includes a forward gear, e.g., one of drive (D) and low (L) and any intermediate or alternate forward gear selection position.

Figure 3:
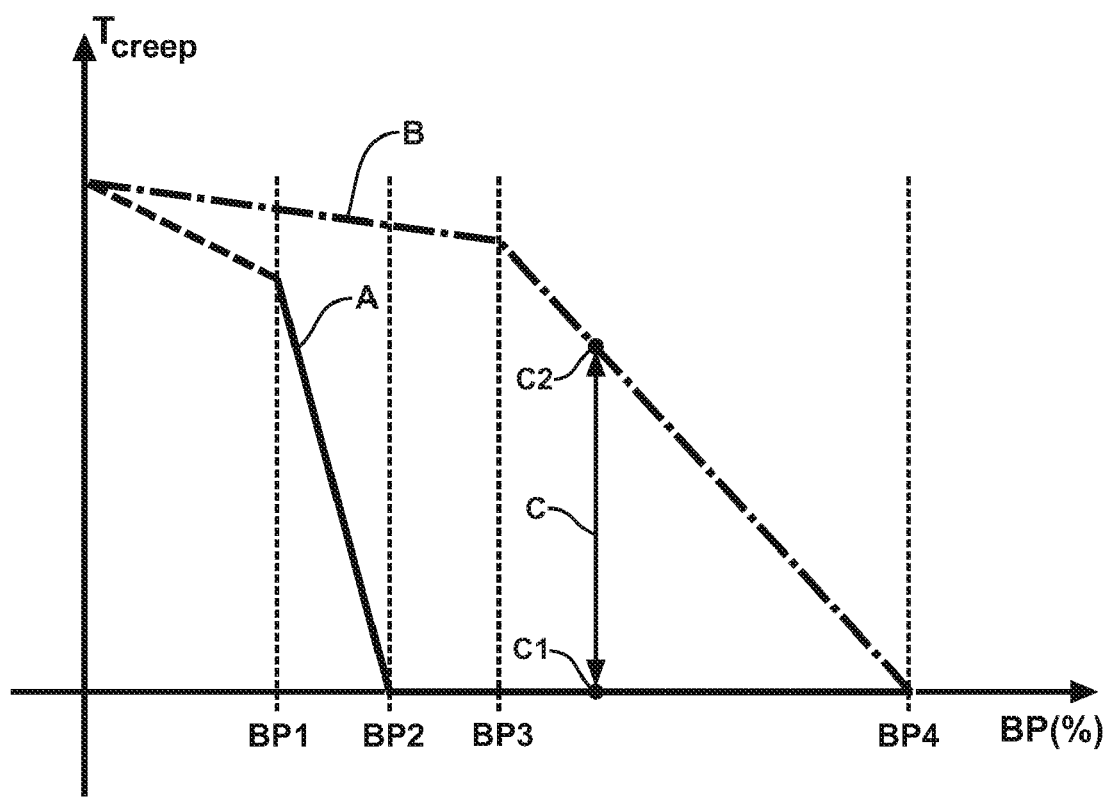
FIG. 3 is a datagraph, in accordance with the present disclosure.

The first control scheme (245) is executed to determine the creep torque $T_{creep}$ associated with the operator input to the brake pedal (BP) 112 using a first relationship shown with reference to Line A of FIG. 3, also shown in FIG. 2. When there is no operator input to the brake pedal (BP) 112 and when the operator input to the brake pedal (BP) 112 is minimal, the magnitude of creep torque $T_{creep}$ is substantially at one magnitude. The magnitude of creep torque $T_{creep}$ is preferably sufficient to cause the vehicle 100 to move on a flat surface at a set speed, e.g., 5 km/h in one embodiment.

The magnitude of creep torque $T_{creep}$ is preferably sufficient to prevent vehicle rollback when the operator-selected direction of travel includes a forward gear when the vehicle 100 is on an inclined surface, e.g., at a 7% grade in one embodiment, and prevent roll-forward of the vehicle 100 when the operator-selected direction of travel includes a reverse gear. Alternatively, a combination of the applied brake torque and the magnitude of creep torque $T_{creep}$ is sufficient to prevent one of rollback and roll-forward of the vehicle 100 when on an inclined surface, allowing the magnitude of creep torque $T_{creep}$ to reduce slightly in response to increasing operator input to the brake pedal (BP) 112. At a first predetermined level for operator input to the brake pedal (BP) 112 (BP1) the magnitude of creep torque $T_{creep}$ rapidly decays relative to an increase in operator input to the brake pedal (BP) 112. At a second predetermined level for operator input to the brake pedal (BP) 112 (BP2) the magnitude of creep torque $T_{creep}$ decreases to zero creep torque $T_{creep}$, with movement of the vehicle 100 controlled by gravitational forces and the vehicle brakes 93. At operator inputs to the brake pedal (BP) 112 greater than the second predetermined threshold, the creep torque $T_{creep}$ is zero, i.e., the hybrid powertrain transfers no tractive torque to the drive wheels 94, thus discontinuing power flow, e.g., electric current to the torque machine(s) 30 and 40 to preserve power and reduce heating caused by the power flow. Preferably the difference between the first and second predetermined thresholds BP1 and BP2 is a brake pedal range of about 5%, allowing some transition between the commanded creep torque $T_{creep}$ and zero creep torque.

The second control scheme (250) is executed to determine the preferred output torque from the hybrid powertrain, i.e., the creep torque $T_{creep}$ associated with the operator input to the brake pedal (BP) 112 under conditions when the vehicle 100 is traveling in an unintended direction, i.e., the operator-selected direction of travel differs from the direction of travel indicated by the rotational position sensor 92. The position of the transmission range selector (PRNDL) 114 indicates the operator-selected direction of travel, including forward for any one of the forward gears, e.g., drive (D), low (L), and any intermediate forward gear selections (not shown), and reverse for the reverse gear (R). Thus, the second control scheme (250) is executed to determine the creep torque $T_{creep}$ associated with the operator input to the brake pedal (BP) 112 when the direction of vehicle travel is in a reverse direction and the position of the transmission range selector (PRNDL) 114 indicates that the operator-selected direction of travel includes one of the forward gears (230). Furthermore, the second control scheme (250) is executed to determine the creep torque $T_{creep}$ associated with the operator input to the brake pedal (BP) 112 when the direction of vehicle travel is in a forward direction and the position of the transmission range selector (PRNDL) 114 indicates that the operator-selected direction of travel includes the reverse gear (240).

The second control scheme (250) is executed to determine the creep torque $T_{creep}$ associated with the operator input to the brake pedal (BP) 112 using a second relationship shown with reference to Line B of FIG. 3, also shown in FIG. 2. When there is no operator input to the brake pedal (BP) 112 and when the operator input to the brake pedal (BP) 112 is minimal or low, the creep torque $T_{creep}$ is substantially the same as for the first relationship described with reference to Line A of FIG. 3. The magnitude of creep torque $T_{creep}$ reduces slightly in response to increasing operator input to the brake pedal (BP) 112. At a third predetermined level for operator input to the brake pedal (BP) 112 (BP3) the magnitude of creep torque $T_{creep}$ begins to decay at a relatively moderate rate relative to an increase in the operator input to the brake pedal (BP) 112. At a fourth predetermined level for operator input to the brake pedal (BP) 112 (BP4) the magnitude of creep torque $T_{creep}$ decays to zero creep torque $T_{creep}$, with movement of the vehicle 100 controlled by the vehicle brakes 93. At operator inputs to the brake pedal (BP) 112 greater than the fourth predetermined threshold, the creep torque $T_{creep}$ is zero, i.e., the hybrid powertrain generates no output torque to the driveline 90, thus discontinuing power flow, e.g., electric current to the torque machine(s) 30 and 40 to preserve power and reduce heating caused by the power flow. The difference between the third and fourth predetermined thresholds BP3 and BP4 is a brake pedal range of about 30% in one embodiment, allowing an extended transition between the commanded creep torque $T_{creep}$ and zero creep torque.

FIG. 3 graphically shows Line A and Line B on a common axis to depict their relative scales. Line C depicts an operating situation whereat there is a transition between the first control scheme (245) and the second control scheme (250), absent any change in the operator input to the brake pedal (BP) 112. This includes an operating situation whereat the direction of vehicle travel transitions from the forward direction to the reverse direction, and, alternatively from the reverse direction to the forward direction. This includes an operating situation when the position of the transmission range selector (PRNDL) 114 indicates that the operator-selected direction of travel transitions from one of the forward gears to the reverse gear, and, alternatively from the reverse gear to one of the forward gears. Illustrative of the transition, Point C1 indicates a creep torque $T_{creep}$ for the first control scheme (245) and Point C2 indicates a corresponding creep torque $T_{creep}$ for the second control scheme (250), both associated with a common operator input to the brake pedal. When there is a transition between the first control scheme (245) and the second control scheme (250), the creep torque transitions between the creep torques C1 and C2 including incorporating a time-rate change in the magnitude of the creep torque during the transition to minimize driveline disturbances. Preferably the time-rate change in the magnitude of the creep torque in the transition from the first control scheme (245) to the second control scheme (250) differs from the time-rate change in the magnitude of the creep torque in the transition from the second control scheme (250) to the first control scheme (245). Preferably the time-rate change in the magnitude of the creep torque in the transition from the first control scheme (245) to the second control scheme (250) happens relatively quickly to minimize driveline disturbances. Preferably the time-rate change in the magnitude of the creep torque in the transition from the second control scheme (250) to the first control scheme (245) happens relatively slowly, limited by the capability of the torque machine(s) 30 and 40 to decrease output torque(s).

Subsequent to selecting the magnitude of creep torque $T_{creep}$ based upon the operator input to the brake pedal (BP) 112 as indicated by a level of brake pedal depression using one of the first and second control schemes (245 and 250), the control module 5 uses the selected magnitude of creep torque $T_{creep}$ to control operation of the first and second torque machines 30 and 40 (260). In the embodiment shown, the first and second torque machines 30 and 40 generate motor torque outputs (TA and TB respectively) that combine to achieve to the selected magnitude of creep torque $T_{creep}$. Alternatively, when only a single torque machine is used, the output torque generate therefrom is sufficient to achieve the selected magnitude of creep torque $T_{creep}$.

The method to determine a magnitude of creep torque $T_{creep}$ to effect vehicle creep and/or vehicle hill-holding 200 is preferably reduced to one or more algorithms that are periodically and iteratively executed in the control module 5 during ongoing vehicle operation. The elements of the method 200 are shown as discrete elements for ease of description. It should be appreciated that the functions described and performed by the vehicle 100 and the hybrid powertrain are depicted as discrete elements but may be executed using one or more devices, e.g., implemented as algorithmic code in the control module 5 using predetermined calibrations, hardware, and/or application-specific integrated circuitry (ASIC).

The embodiment of FIG. 1 shows first and second torque machines 30 and 40, but the control method 200 can be executed in various powertrain systems. This includes a hybrid powertrain employing a single torque machine that is configured to interact with an internal combustion engine and a hybrid transmission to transfer tractive torque to drive wheel(s), and a hybrid powertrain employing multiple torque machines wherein one of the torque machines is configured to interact with an engine and/or a hybrid transmission to transfer tractive torque to drive wheel(s). The method 200 can be executed in powertrain systems employing non-electric torque machines wherein one of the torque machines is operative to spin the engine.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a powertrain system including an engine and a hybrid transmission configured to propel a land vehicle, comprising:

monitoring a speed of the vehicle;

determining an actual direction of vehicle travel as one of a first direction and a second direction;

monitoring operator inputs to a brake pedal and an accelerator pedal;

monitoring a position of a transmission range selector to determine an operator-selected direction of vehicle travel as one of the first direction and the second direction;

operating the hybrid powertrain in a creep torque mode at a preferred output torque when the operator input to the accelerator pedal is zero and the magnitude of speed of the vehicle is less than a predetermined threshold, the creep torque mode including executing a first control scheme to determine the preferred output torque as a first function of the operator input to the brake pedal when the actual direction of vehicle travel is the first direction and the operator-selected direction of vehicle travel is also the first direction, and executing a second control scheme to determine the preferred output torque as a second function of the operator input to the brake pedal when the actual direction of vehicle travel is the second direction and the operator-selected direction of vehicle travel is the first direction; and controlling a torque machine of the hybrid powertrain to generate tractive torque responsive to the preferred output torque.

2. The method of claim 1, further comprising transitioning between the first control scheme and the second control scheme when the actual direction of vehicle travel transitions between the first direction and the second direction.

3. The method of claim 1, wherein the first direction is a forward direction and the second direction is a reverse direction.

4. The method of claim 1, wherein the first direction is a reverse direction and the second direction is a forward direction.

5. The method of claim 1, further comprising operating the engine in one of a fuel cutoff mode and an engine-off mode during the creep torque mode.

6. The method of claim 1, wherein the preferred output torque during execution of the first control scheme is sufficient to prevent vehicle travel in the second direction when the vehicle is on an inclined surface and the operator input to the brake pedal is less than a first threshold.

7. The method of claim 6, wherein the preferred output torque during execution of the first control scheme is zero when the operator input to the brake pedal is greater than a second threshold.

8. Method for controlling a hybrid powertrain system including an internal combustion engine and a torque machine configured to generate tractive torque to propel a land vehicle, comprising:

monitoring magnitude and direction of vehicle travel;
monitoring operator inputs to a brake pedal and an accelerator pedal;
monitoring a position of a transmission range selector; and
operating the hybrid powertrain system in a creep torque mode at a preferred output torque when the operator input to the accelerator pedal is zero and the magnitude of vehicle travel is less than a predetermined threshold, the creep torque mode including
determining the preferred output torque as a first function of the operator input to the brake pedal when the direction of vehicle travel is forward and the position of the transmission range selector indicates a forward gear,
determining the preferred output torque as a second function of the operator input to the brake pedal when the direction of vehicle travel is backward and the position of the transmission range selector indicates a forward gear, and
generating the preferred output exclusively with the torque machine.

9. The method of claim 8, wherein the torque machine comprises an electric motor/generator device.

10. Method for controlling a hybrid powertrain system including a torque machine configured to propel a land vehicle, comprising:
monitoring a magnitude of vehicle speed and a direction of vehicle travel;
monitoring operator inputs to a brake pedal and an accelerator pedal;
monitoring a position of a transmission range selector to determine an operator-selected direction of vehicle travel;
determining a preferred output torque from the hybrid powertrain system as a first function of the brake pedal when the direction of vehicle travel is forward and the operator-selected direction of travel is a forward gear;
determining the preferred output torque from the hybrid powertrain system as a second function of the brake pedal when the direction of vehicle travel is reverse and the operator-selected direction of travel is a forward gear; and
operating the hybrid powertrain system at the preferred output torque when the operator input to the accelerator pedal is zero and the magnitude of vehicle speed is less than a predetermined threshold.

11. The method of claim 10, further comprising determining the preferred output torque from the hybrid powertrain system as the second function of the brake pedal when the direction of vehicle travel is forward and the operator-selected direction of travel is a reverse gear.

12. The method of claim 10, further comprising determining the preferred output torque from the hybrid powertrain system as the first function of the brake pedal when the direction of vehicle travel is reverse and the operator-selected direction of travel is a reverse gear.

13. The method of claim 10, wherein operating the hybrid powertrain system at the preferred output torque when the operator input to the accelerator pedal is zero and the magnitude of vehicle speed is less than a predetermined threshold comprises operating an internal combustion engine in one of a fuel cutoff mode and an engine-off mode.

14. The method of claim 10, wherein the preferred output torque when the direction of vehicle travel is forward and the operator-selected direction of travel is a forward gear is sufficient to prevent vehicle travel in reverse when the vehicle is on an inclined surface and the operator input to the brake pedal is less than a first threshold.

15. The method of claim 14, wherein the preferred output torque when the direction of vehicle travel is forward and the operator-selected direction of travel is a forward gear is zero when the operator input to the brake pedal is greater than a second threshold.

* * * * *